(12) United States Patent
Eftekharzadeh

(10) Patent No.: US 9,787,161 B2
(45) Date of Patent: Oct. 10, 2017

(54) METHOD AND APPARATUS FOR NEAR-ISOTHERMAL COMPRESSED GAS ENERGY STORAGE

(71) Applicant: Shahriar Eftekharzadeh, Torrance, CA (US)

(72) Inventor: Shahriar Eftekharzadeh, Torrance, CA (US)

( * ) Notice: Subject to any disclaimer, the term of this patent is extended or adjusted under 35 U.S.C. 154(b) by 68 days.

(21) Appl. No.: 15/018,746

(22) Filed: Feb. 8, 2016

(65) Prior Publication Data

US 2017/0229941 A1 Aug. 10, 2017

(51) Int. Cl.
| F01K 13/00 | (2006.01) |
| H02K 7/18 | (2006.01) |
| H02K 7/116 | (2006.01) |
| F15B 1/02 | (2006.01) |

(52) U.S. Cl.
CPC .......... *H02K 7/1853* (2013.01); *H02K 7/116* (2013.01); *F15B 1/024* (2013.01)

(58) Field of Classification Search
CPC ........ H02K 7/1853; H02K 7/116; F15B 1/024
See application file for complete search history.

(56) References Cited

U.S. PATENT DOCUMENTS

| 5,730,117 A * | 3/1998 | Berger ...................... F24J 2/38 |
| | | 126/600 |
| 5,816,668 A * | 10/1998 | Heubner ............... B60T 8/3225 |
| | | 303/115.2 |
| 7,874,155 B2 * | 1/2011 | McBride ............... F15B 11/032 |
| | | 60/413 |
| 8,037,678 B2 * | 10/2011 | McBride ................. F15B 1/024 |
| | | 60/412 |
| 8,109,085 B2 * | 2/2012 | McBride ................. F15B 1/024 |
| | | 60/412 |
| 8,733,610 B2 * | 5/2014 | Pedicini .................... B25C 5/15 |
| | | 173/201 |
| 9,314,664 B2 * | 4/2016 | Villaume ........... A63B 22/0605 |
| 2010/0270871 A1 * | 10/2010 | Chou ................... H02K 7/1853 |
| | | 310/30 |
| 2011/0266810 A1 * | 11/2011 | McBride ................. F04B 17/03 |
| | | 290/1 |
| 2013/0327029 A1 * | 12/2013 | McBride ................. F15B 1/024 |
| | | 60/413 |

* cited by examiner

*Primary Examiner* — Michael Zarroli

(57) ABSTRACT

A method and apparatus for gas compression and expansion that simultaneously serves as storage tank for the compressed gas, and heat exchanger for heat transfer to the environment to maintain near-isothermal conditions.

5 Claims, 11 Drawing Sheets

METHOD AND APPARATUS FOR NEAR-ISOTHERMAL COMPRESSED GAS ENERGY STORAGE

FIELD OF THE INVENTION

The present invention is in the field of methods and devices for storing and recovering electrical energy using compressed gas. More specifically, the present invention discloses a new method and apparatus for near-isothermal gas compression and expansion in a closed vessel for electrical energy storage.

BACKGROUND OF THE INVENTION

The ability to store electrical energy is widely recognized as a key limiting factor in the widespread use of renewable energies such as wind and solar, which are intrinsically intermittent in their supply capabilities. Electricity storage is also recognized as a necessity in an electrical grid to store excess (base) supply during hours of low demand for release during hours of high (peak) demand.

There are many techniques available for storing excess electrical energy for later release. A comprehensive account of the various available electrical energy storage techniques is provided in U.S. Pat. No. 7,832,207 (the '207 patent), the disclosure of which is hereby incorporated herein by reference in its entirety.

Compressed air energy storage (CAES) is an effective means of storing electrical energy and has a long history of development. The main challenge in accomplishing a high level of energy storage and recovery efficiency is to either maintain the temperature relatively constant during both compression (energy storage) and expansion (energy release) in an isothermal process, or store the heat generated during compression to reheat the gas during expansion in an adiabatic process. An isothermal process has an intrinsically much higher energy storage and recovery potential than an adiabatic process, and is therefore more desirable. However, an isothermal process requires provisions for adequate exchange of large quantities of heat between the gas and its environment, which requires heat exchange systems that add complexity and cost. Also, an isothermal process cannot directly use the compressed air to drive an electrical generator such as in a turbine, as the rapid expansion of the gas is inherently adiabatic. Current approach is to use a liquid as the working fluid in a hydraulic-pneumatic accumulator and intensifier arrangement and thereby avoid rapid adiabatic gas expansion for power generation. The hydraulic-pneumatic accumulator and intensifier arrangement is intricate and requires special hardware and software that add complexity and cost to the overall CAES system.

Current hydraulic-pneumatic CAES systems are either closed-air in which the gas is sealed within a cylinder and is never expanded to or compressed from atmospheric pressure, or open-air in which the air is pressurized from atmospheric pressure and expanded back to atmospheric pressure by venting to open air. Closed-air systems have the desired feature of being sealed and thus protected against moisture and dust in the compressed air since they are charged only once in a controlled environment with a certain mass of clean dry air. However, current closed-air systems are not economical because practical limits on the size and maximum pressure of conventional cylinders limit their energy storage capability. To make existing closed-air systems capable of significant energy storage, many large cylinders would be needed requiring extensive land. Open air hydraulic-pneumatic accumulator and intensifier arrangements utilize specialized hydraulic machines and control software with complex valve switching sequences. These systems are recent and currently under development such that they do not have an operational track record.

Using a direct heat-exchange subsystem with cylinders, such as an external jacket, to simplify existing systems and reduce cost is not currently effective because existing air compression technologies use successive rapid compressions of small quantities of gas that generate heat and therefore require an equally rapid rate of heat transfer to maintain isothermal conditions, which far exceeds the available rate of heat exchange across the cylinder perimeter area.

Therefore, there is a need for a simple and practical system for compressing and expanding gas isothermally, without the need for separate heat exchange subsystem and hydraulic-pneumatic accumulator and intensifier arrangement. Such a system would reduce complexity and cost electrical energy storage making its widespread use feasible.

SUMMARY OF THE INVENTION

The present invention provides a solution for the above stated need with a simple and practical means of compressing, storing, and expanding gas using a substantially isothermal process (near-isothermal) that can store significant amounts of electrical energy.

The present invention is essentially a piston and cylinder apparatus for gas compression and expansion that simultaneously serves as storage tank for the compressed gas, and heat exchanger for heat transfer to the environment to maintain near-isothermal conditions. The cylinder of the present invention is fabricated from thermally conductive material having high tensile strength such as steel and is sealed at one end. The piston of the present invention separates the cylinder into a pneumatic side and a mechanical side, and constitutes part of a mechanism that transfers energy there between without using a rod. The pneumatic side of the cylinder is initially charged with a certain mass of gas such as clean dry air, which raises its initial internal pressure to a certain level at ambient temperature. This constitutes the initial state (pressure, volume, and temperature) of the gas inside the cylinder. The mass of the initial gas introduced inside the cylinder comprises the entire mass of the working gas needed for the amount of energy to be stored i.e. there is no addition of gas to the cylinder during the energy storage (compression) and recovery (expansion) cycle, and the system is entirely a closed one.

The present invention stores the total amount of energy to be stored during the course of a single stroke of the piston moving in, which compresses the gas from initial state to final state, and recovers the total amount of energy stored during the course of a single stroke of the piston moving out, which allows the gas to expand back to initial state. Given that solar and wind power variations are predominantly diurnal, the entire energy storage (compression) and energy recovery (expansion) cycle typically takes place over the course of a 24-hour period. This means that the compression and expansion phases of the present invention are intrinsically slow and thus favorable for isothermal conditions.

The maximum rate of gas compression and expansion is predetermined by the maximum rate of power input and output for the particular size cylinder and piston assembly. In order to assure near-isothermal conditions, the cylinder of the present invention is sized such that the rate of compression and expansion corresponding to the input and output power rating respectively do not result in heat generation and cooling rates in excess of the available rate of heat transfer and exchange with ambient environment across the cylinder perimeter contact area, thus maintaining the temperature of gas and cylinder practically constant (near-isothermal).

The present invention provides adequate heat exchange capability compared with heat generation and cooling by using a long slender cylinder, which has the property of high surface area to internal volume ratio, and by placing the cylinder in an environment of relatively high thermal conductivity and infinite mass that acts as heat sink during compression and heat source during expansion, such as belowground. The placement of the cylinder belowground may be horizontal, such as inside a trench with backfill similar to the laying of a pipeline, or vertical by drilling a hole of desired diameter and length belowground and inserting a casing of required tensile strength to serve as the cylinder, similar to installation of a water or an oil well. The vertical placement of the cylinder is advantageous because it has a small footprint and thus resolves the requirement for extensive land that is reported as a problem with existing closed systems.

Various mechanisms of energy transfer may be employed to move the piston inside the cylinder and compress the gas to its final state and thereby store a predetermined amount of electrical energy, and recover the stored energy during gas expansion. The various mechanisms constitute different embodiments of the present invention. In one embodiment, the piston is equipped with gears that engage with the internal perimeter of the cylinder through slots along the length of the cylinder interior. The gears fit the slots to enable mechanical power transmission to and from the electrical motor/generator, similar to the interface of a road surface and the drive wheels of a motor vehicle. In this embodiment, the piston can only move along the cylinder in unison with the rotation of the gears. Providing simultaneous power to rotate the gears in the sense that moves the piston in compresses the gas and stores energy, and allowing the piston to move out rotates the gears in reverse to generate energy. To provide a gas-tight seal between the piston and the interior perimeter of the cylinder, the spacing, thickness, and number of rings, which the piston may be equipped with, can be used in conjunction with the spacing and opening size of the slots to prevent any piston position that creates a bypass route through the slots for the pressurized gas to escape.

There are a number of different ways to power the gears to compress the gas and store energy, and to extract power from the gears during expansion. In one embodiment of the present invention, direct mechanical linkage between the motor/generator and the piston is used, with all equipment mounted on the piston. With this arrangement, the motor/generator moves along the cylinder with the piston during gas compression for energy storage, and moves out with the piston during gas expansion as the movement of piston rotates the gears and transmits power to motor/generator causing energy generation. In this embodiment, there is an electrical conductor in continuous contact with the motor/generator that transmits the electrical power. The electrical conductor may have adjustable length such as a flexible cable attached to a spring-loaded roller, or may be built into the cylinder perimeter. This embodiment of the present invention minimizes power transmission losses through direct coupling of the piston with the electrical motor/generator but the arrangement may limit the size of motor/generator. The embodiment also requires a dedicated motor/generator for each individual cylinder, which may not be optimal in larger energy storage systems.

In another embodiment of the present invention, the gears are powered by a hydraulic motor/pump mounted on the piston, which is in hydraulic communication with a second fixed hydraulic motor/pump via high-pressure flexible tubing of adjustable length, with the hydraulic motor/pump mechanically linked to a motor/generator. With this arrangement, hydraulic fluid is pumped under high pressure by the fixed hydraulic motor/pump-motor/generator assembly to the hydraulic motor/pump mounted on the piston, which acts in motor mode to rotate the gears in the sense that move the piston in to compress the gas and store electrical energy. During energy recovery, the process is reversed by allowing gas expansion to push the piston out and thereby rotate the gears and pump hydraulic fluid to the fixed hydraulic motor/pump-motor/generator assembly to generate power. One advantage of this embodiment of the present invention is that one fixed hydraulic motor/pump-motor/generator assembly can be used with a plurality of cylinders each equipped with their own piston and hydraulic motor/pump.

In yet another embodiment of the present invention, the cylinder may be equipped with a central screw shaft with bearings at either end passing through the center of a piston coupled with a linearly moving screw nut, in a configuration that is similar to existing linear positioners. In this embodiment, energy storage is accomplished by rotating the central shaft to move the piston-nut assembly in to compress the gas, and energy recovery is accomplished by allowing the shaft to rotate in reverse direction by the force of the piston being pushed out by the expanding gas. This embodiment of the present invention has the advantage of mounting minimum equipment on the piston, but requires a long power transmission shaft that has practical limits in length.

In a further embodiment of the present invention, the interior of the cylinder may be tapped with a continuous thread of certain pitch and count to fit a solid cylindrical pellet of matching thread that functions as the piston. An electrical motor/generator assembly secured to a sliding mechanism inside the cylinder rotates the piston in one direction to move it inwards and compress the gas to store energy. Energy recovery is accomplished by allowing the piston to rotate in reverse direction by the force of the expanding gas.

Vertical installation of the cylinder of the present invention may be accomplished by a number of well-established methods currently used in deep borehole drilling in water and oil wells, caisson construction for bridge piers and building columns, and access shaft installation in tunneling and mining industries. The choice of the method depends on the diameter and depth of the individual cylinders, and the geotechnical properties of the ground formation and layers below. Commercially available borehole drilling rigs can reach depths of more than 5000 feet (1500 m) with casing diameters of up to 30 inches (760 mm). Current caisson and access shaft drilling rigs can readily drill holes with diameters of 14 feet (4.3 m) and depths of more than 300 feet (90 m) in a wide range of ground conditions. There are very deep boreholes for oil extraction with depths of more than 33,000 feet (10,000 m).

Therefore, the length of the cylinder of the present invention installed vertically can range from few feet to several thousand, which provides tremendous flexibility in configuring, sizing, and optimizing an electrical energy storage system. Combined with the small footprint of vertical installation, the present invention provides the means for virtually unlimited storage capacity and widespread adoption and use of electrical energy storage applicable to a wide range of electrical energy storage needs, from a single household of a few kilowatt hours (kWh) to large central facilities of several megawatt hours.

It is an object of this invention to provide a simple and practical system for a near-isothermal closed-air CAES system that can store significant amounts of electrical energy.

It is an object of this invention to provide improved elements and arrangements by apparatus for the purposes described thereof, which is comparable in cost with existing systems, dependable, and fully effective in accomplishing its intended purposes.

These and other objects of the present invention will become readily apparent upon further review of the following specification and drawings.

DETAILED DESCRIPTION

Figure 1:
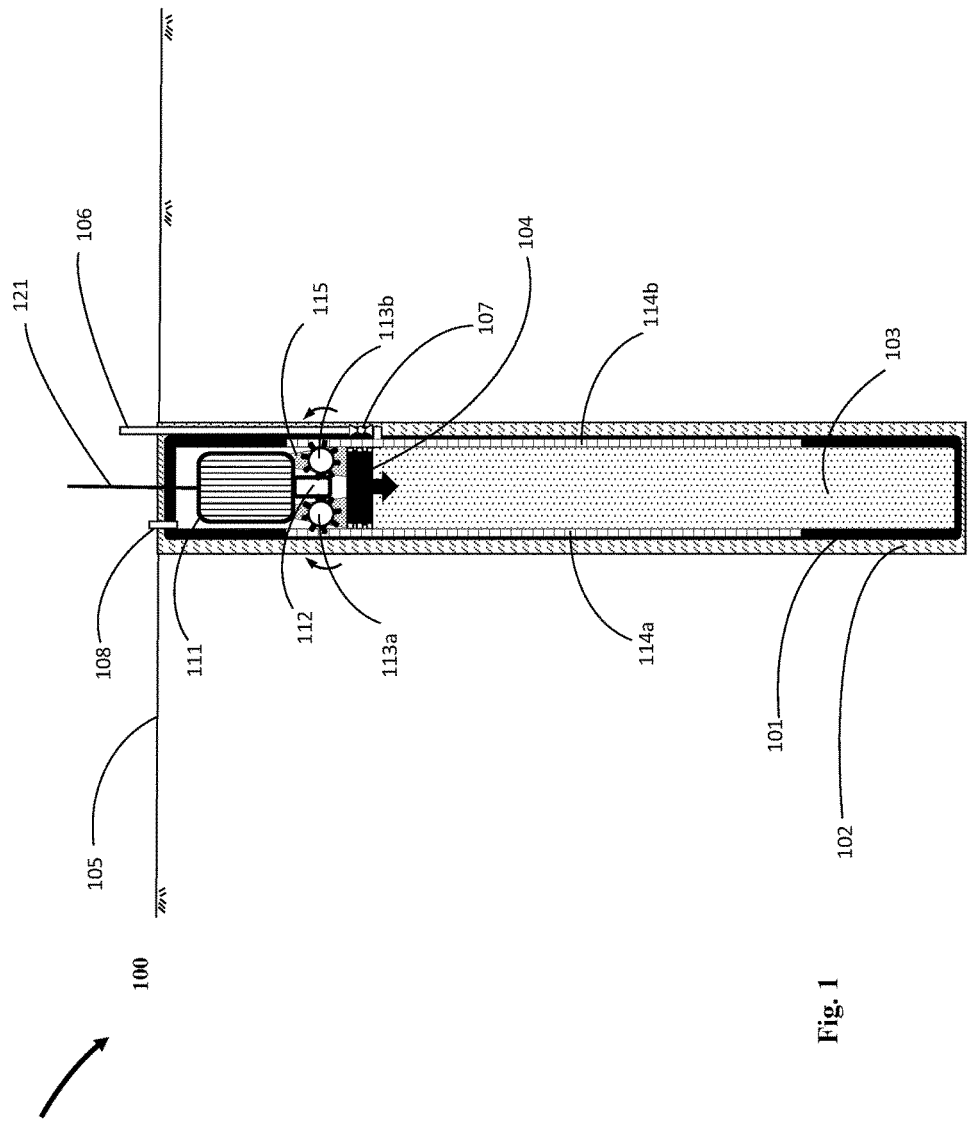
FIG. 1 is a profile of one embodiment of the present invention during gas compression showing a vertical underground cylinder and piston apparatus using a motor/generator/gear assembly mounted on the piston.

Referring to FIG. 1, there is shown one embodiment of the present invention 100 comprised of cylinder 101 installed vertically below ground 105 using conventional vertical shaft drilling techniques, with backfill such as concrete in annulus 102. Cylinder 101 is sealed at its lower end and fitted with a moveable mechanical boundary such as piston 104 disposed to separate cylinder 101 into a pneumatic side and a mechanical side. Cylinder 101 is disposed to store gas 103 under pressure as well as function as compression/expansion cylinder by means of piston 104 to compress gas 103 up to a certain design pressure and allow expansion back to original pressure, plus function as heat exchanger to transfer heat to and from gas 103 to surrounding ground 105 via surface area of cylinder 101 and annulus 102. Cylinder 101 is initially charged with gas 103 under a certain pressure via pressure piping 106 and valve 107.

Motor/generator 111 is mounted on piston 104, and linked to gear box 112 that connects to at least one pair of directly aligned opposite facing gears 113a and 113b. Gears 113a and 113b are disposed to engage with the internal perimeter of cylinder 101 through at least two rows of longitudinally arranged and equally-spaced slots 114a and 114b disposed along the length of cylinder 101 interior, one for each gear 113a and 113b. The interlocking of gears 113a and 113b with longitudinally disposed slots 114a and 114b links the mechanical power transmission train to and from electrical motor/generator 111 on piston 104 to cylinder 101 and is similar in form and function to the interface of the drive wheels of a motor vehicle and road surface. With this arrangement movement of piston 104 can only occur if gears 113a and 113b also rotate. Counter rotation of gears 113a and 113b in one sense moves piston 104 in one direction and movement of piston 104 in the opposite direction causes reversal in rotation of gears 113a and 113b. With this arrangement, providing simultaneous mechanical power to gears 113a and 113b to move piston 104 in results in compression of gas 103 and stores energy, and allowing piston 104 to move out rotates gears 113a and 113b in reverse and provides for energy generation. Gas-tight sealing of piston 104 against interior perimeter of cylinder 101 may be accomplished by adjusting the spacing, thickness, and number of rings on piston 104, plus varying the spacing and opening size of slots 114a and 114b in a manner that prevents any position of piston 104 along cylinder 101 with a bypass route through any of slots 114a and 114b for gas 103 to escape.

During compression in the embodiment of the present invention 100 shown in FIG. 1, electrical conductor 121 supplies electrical energy to motor/generator 111, which functions in motor mode to convert electrical energy to mechanical work and transmit it via gear box 121 to provide simultaneous power input to gears 113a and 113b to counter rotate in the sense that moves piston 104 in to compress gas 103 and store electrical energy in the form of compressed gas energy. Being connected with piston 104, motor/generator assembly 111 and gear box 112 move with piston 104 in inside cylinder 101, during compression.

Figure 2:
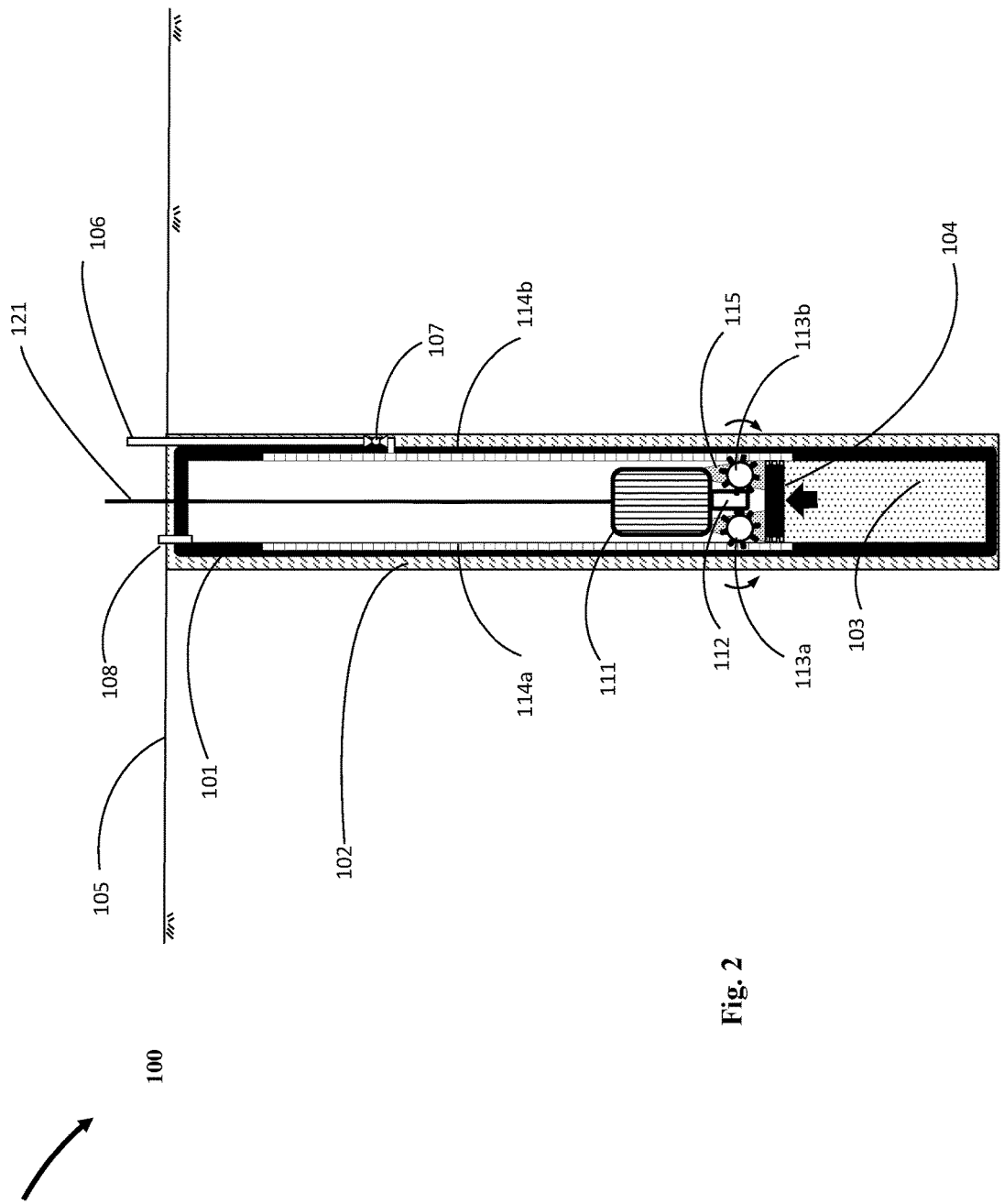
FIG. 2 a profile of the same embodiment of the present invention as in FIG. 1 during gas expansion.

FIG. 2 shows the same embodiment of the present invention 100 of FIG. 1 during expansion with gas 103 having been compressed to maximum pressure and piston 104 being allowed to move out by the force of gas 103. The outward movement of piston 104 causes gears 113a and 113b to counter rotate in reverse and transmit mechanical power via gearbox 112 to motor/generator 111, which functions in generator mode to convert mechanical power into electrical power and transmit it out via conductor 121.

Figure 3:
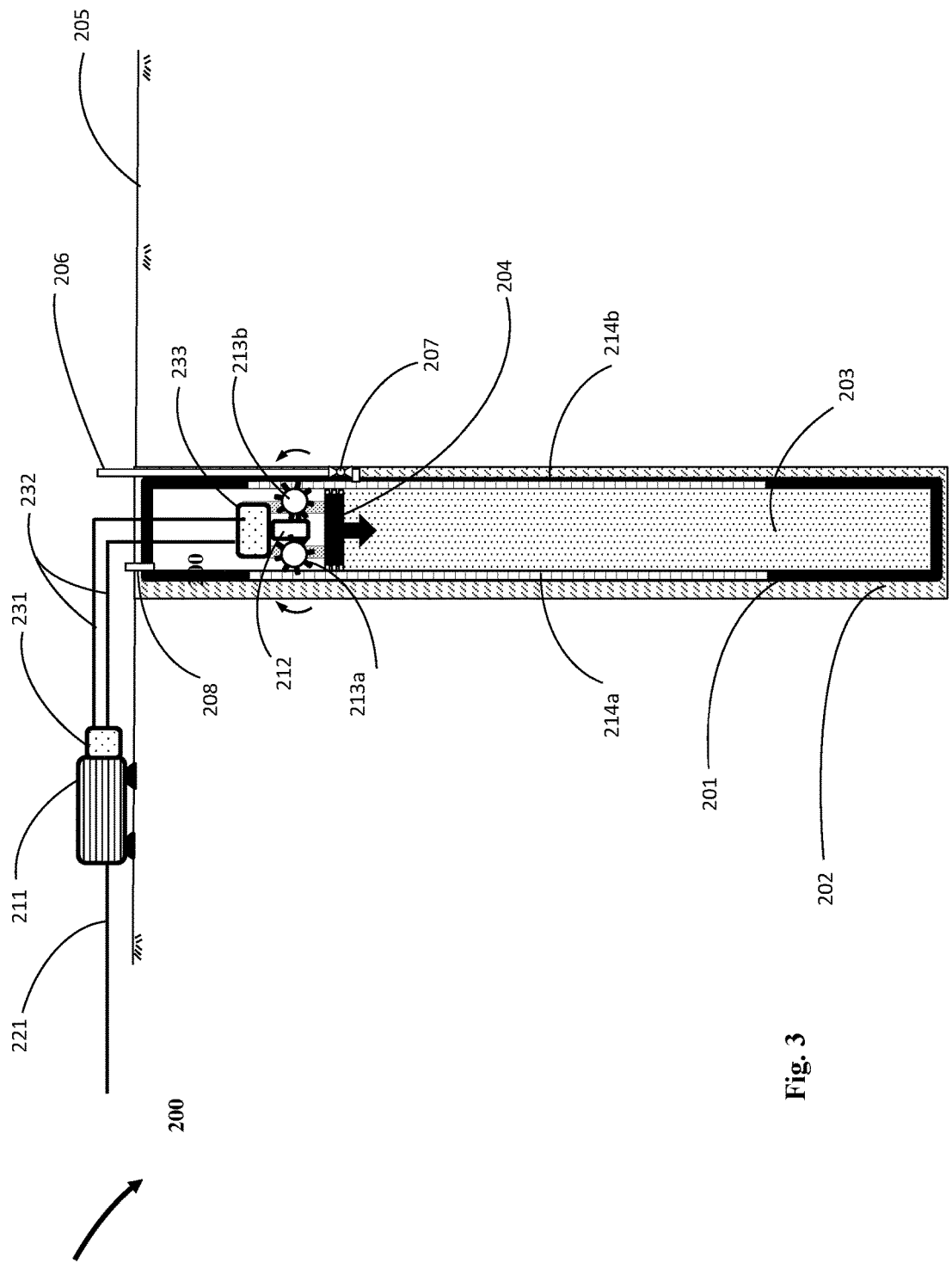
FIG. 3 is a profile of another embodiment of the present invention during gas compression showing a vertical underground cylinder and piston apparatus using a hydraulic pump/motor mounted on piston and a hydraulic mort/pump-electrical motor/generator assembly located outside the cylinder.

Referring to FIG. 3, there is shown another embodiment of the present invention 200 comprised of cylinder 201 installed vertically below ground 205 using conventional vertical shaft drilling techniques, with backfill such as concrete in annulus 202. Cylinder 201 is sealed at lower end and fitted with a moveable mechanical boundary such as piston 204 disposed to separate cylinder 202 into a pneumatic side and a mechanical side. Cylinder 201 is disposed to store gas 203 under pressure as well as function as compression/expansion cylinder by means of piston 204 to compress gas 203 up to certain design pressure and allow expansion back to original pressure, plus function as heat exchanger to transfer heat to and from gas 203 to surrounding ground 205 via surface area of cylinder 201 and annulus 202. Cylinder 201 is initially charged with gas 203 under certain pressure via pressure piping 206 and valve 207. The mechanical side of cylinder 201 is vented to the atmosphere via duct 208.

Hydraulic pump/motor 233 is mounted on piston 204, and directly linked to gear box 212 that connects to at least one pair of directly aligned opposite facing gears 213a and 213b. Gears 213a and 213b are disposed to engage with the internal perimeter of cylinder 201 through at least two row of longitudinally arranged and equally-spaced slots 214a and 214b disposed along the length of cylinder 201 interior, one for each gears 213a and 213b. The interlocking of gears 213a and 213b with longitudinally disposed slots 214a and 214b links the mechanical power transmission train to and from a hydraulic motor/pump 233 on piston 204 to cylinder 201 and is similar in form and function to the interface of the drive wheels of a motor vehicle and a road surface. With this arrangement movement of piston 204 can only occur if gears 213a and 213b also rotate. Counter rotation of gears 213a and 213b in one sense moves piston 204 in one direction and movement of piston 204 in the opposite direction causes reversal in rotation of gears 213a and 213b. With this arrangement, providing simultaneous mechanical power to gears 213a and 213b that moves piston 204 in results in compression of gas 203 and stores energy, and allowing piston 204 to move out rotates gears 213a and 213b in reverse and provides for energy generation. Gas-tight sealing of piston 204 against interior perimeter of cylinder 201 may be accomplished by adjusting the spacing, thickness, and number of rings on piston 204, plus varying the spacing and opening size of slots 214a and 214b in a manner that prevents any position of piston 204 along cylinder 201 with a bypass route through any of slots 214a and 214b for gas 203 to escape.

During compression in the embodiment of the present invention 200 shown in FIG. 3, electrical conductor 221 supplies electrical energy to a stationary motor/generator assembly 211, located outside cylinder 201. Motor/generator assembly 211 functions in motor mode to convert electrical energy to mechanical work and transmit it to hydraulic motor/pump 231 that functions in pump mode to provide hydraulic power via flexible pressure tubes 232 to hydraulic pump/motor 233. Hydraulic pump/motor 233 functions in motor mode to provide simultaneous power to gears 213a and 213b to move piston 204 in to compress gas 203 and store electrical energy in the form of compressed gas energy. Being connected to piston 204, hydraulic pump/motor assembly 233 and gear box 212 move with piston 204 inwards inside the cylinder 201, during compression.

Figure 4:
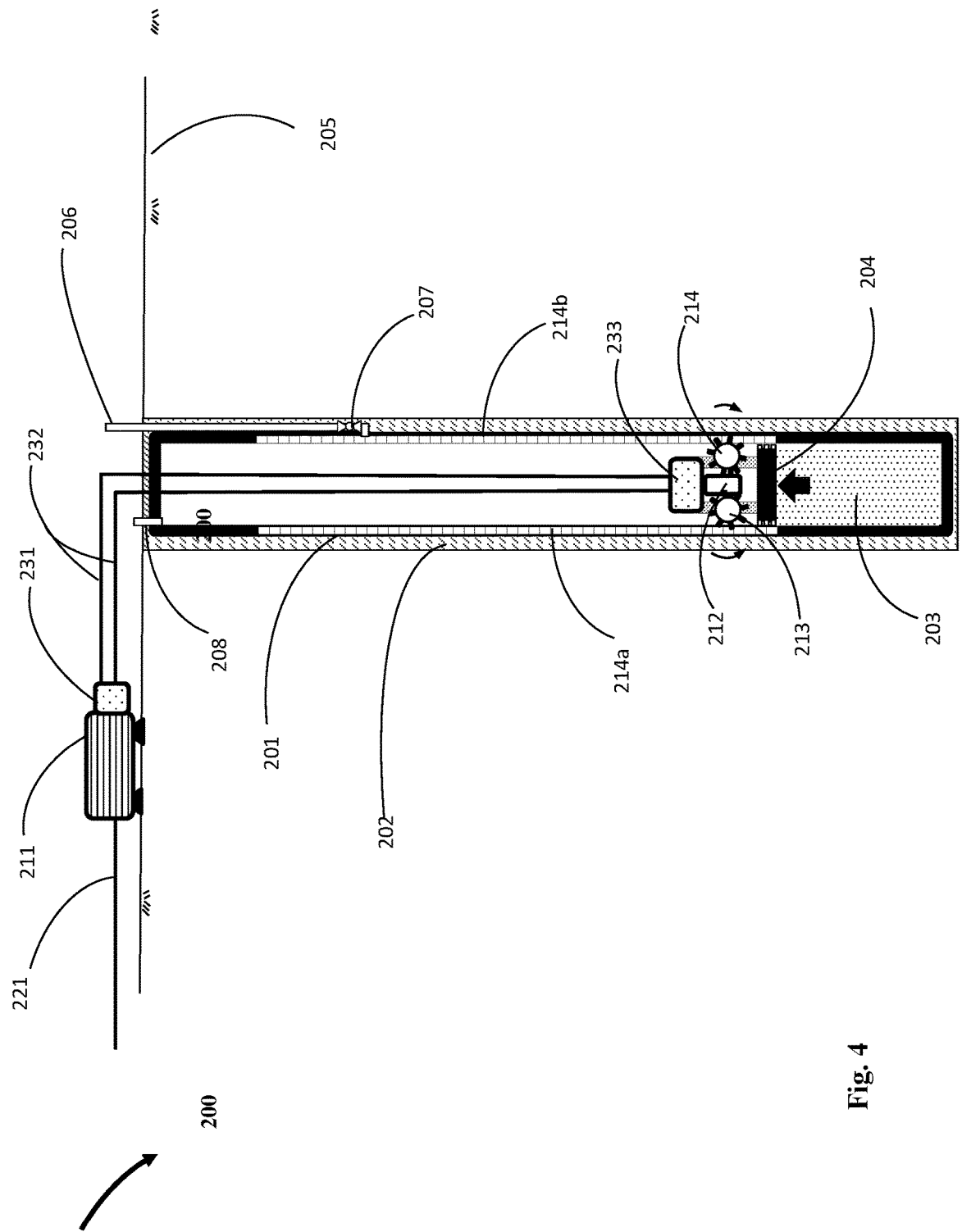
FIG. 4 a profile of the same embodiment of the present invention as in FIG. 3 during gas expansion.

FIG. 4 shows the embodiment of the present invention 200 of FIG. 3 during expansion process with gas 203 having been compressed to its maximum pressure and piston 204 being allowed to move out by the force of expanding gas 203. The outward movement of piston 204 causes gears 213a and 213b to transmit mechanical power via gearbox 212 to hydraulic pump/motor 233, which functions in pump mode to transmit hydraulic power via pressure tubing 232 to hydraulic pump/motor 231, which functions in motor mode to transmit mechanical power to electrical motor/generator 211, which functions in generator mode to convert mechanical power into electrical power and transmit it out via conductor 221.

Figure 5:
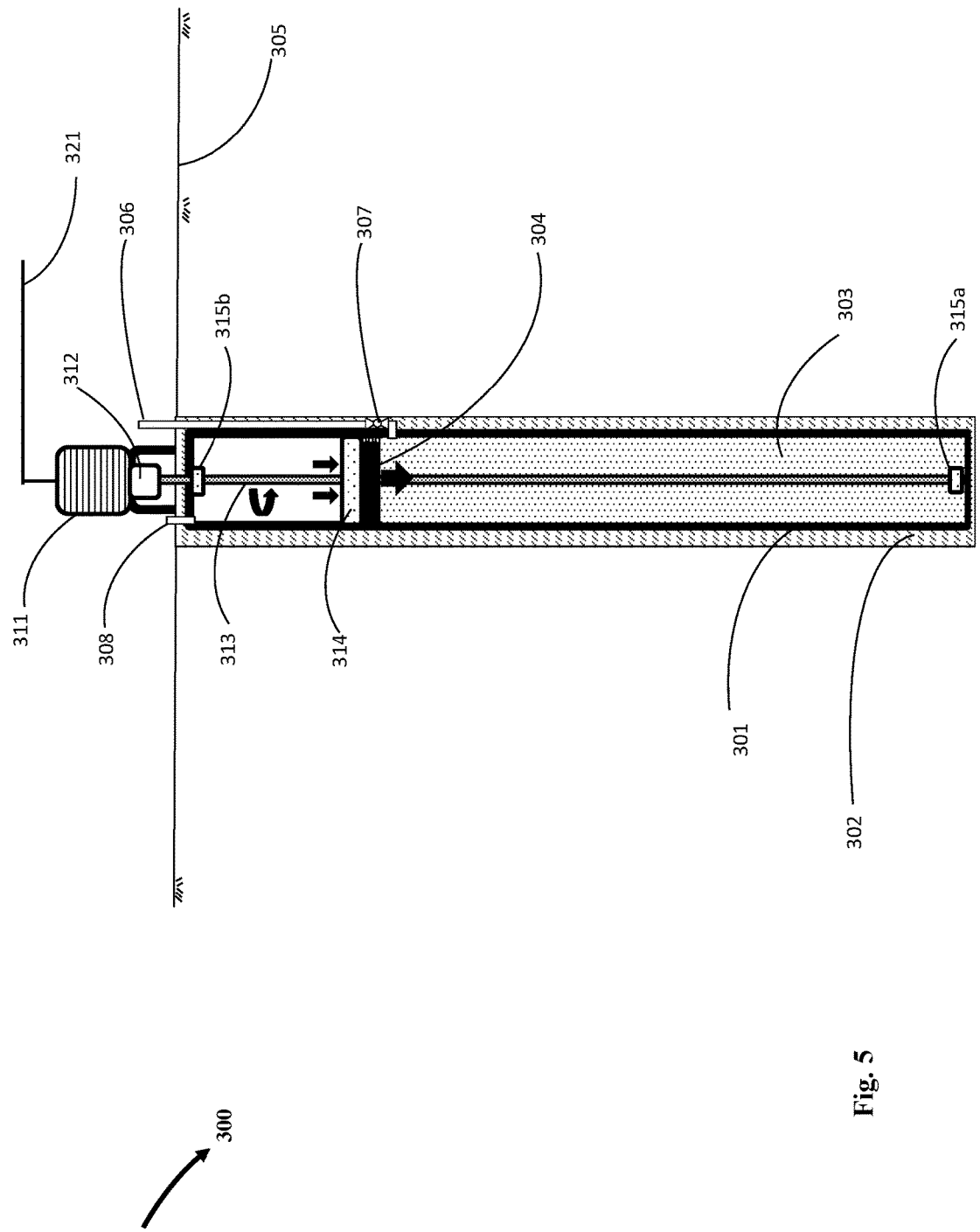
FIG. 5 is a profile of another embodiment of the present invention during gas compression showing a vertical underground cylinder and piston apparatus using a vertical screw shaft with piston-screw nut assembly.

Referring to FIG. 5, there is shown another embodiment of the present invention 300 comprised of cylinder 301 installed vertically below ground 305 using conventional vertical shaft drilling techniques, with backfill such as concrete in annulus 302. Cylinder 301 is sealed at lower end and fitted with a moveable mechanical boundary such as piston 304 disposed to separate the cylinder into a pneumatic side and a mechanical side. Cylinder 301 is disposed to store gas 303 under pressure as well as function as a compression/expansion cylinder by means of piston 304 to compress gas 303 up to certain design pressure and allow expansion back to original pressure, plus function as heat exchanger to transfer heat to and from air 303 to surrounding ground 305 via surface area of cylinder 301 and annulus 302. Cylinder 301 is initially charged with gas 303 under certain pressure via pressure piping 306 and valve 307. Mechanical side of cylinder assembly is vented to the atmosphere via duct 308. Electrical motor/generator 311 is fixed in position and in mechanical communication with gear box 312 that drives vertical screw shaft 313 with bearings at either end 315a and 315b passing through the center of piston 304, which is coupled with screw nut 314 that is engaged with longitudinal groove (not shown) along the interior length of the cylinder 301 to provide screw nut 314 with longitudinal freedom of movement while restricting all rotational movement, in a configuration that is similar to linear positioners.

During compression in the embodiment of the present invention 300 shown in FIG. 5, electrical conductor 321 supplies electrical energy to stationary motor/generator 311, located outside cylinder 301. Motor/generator 311 functions in motor mode to convert electrical energy to mechanical work and transmit it to the central screw shaft 313 via gear box 312 in the sense that moves screw nut 314 inward to push piston 304 in and compress gas 303 and store electrical energy in the form of compressed gas energy.

Figure 6:
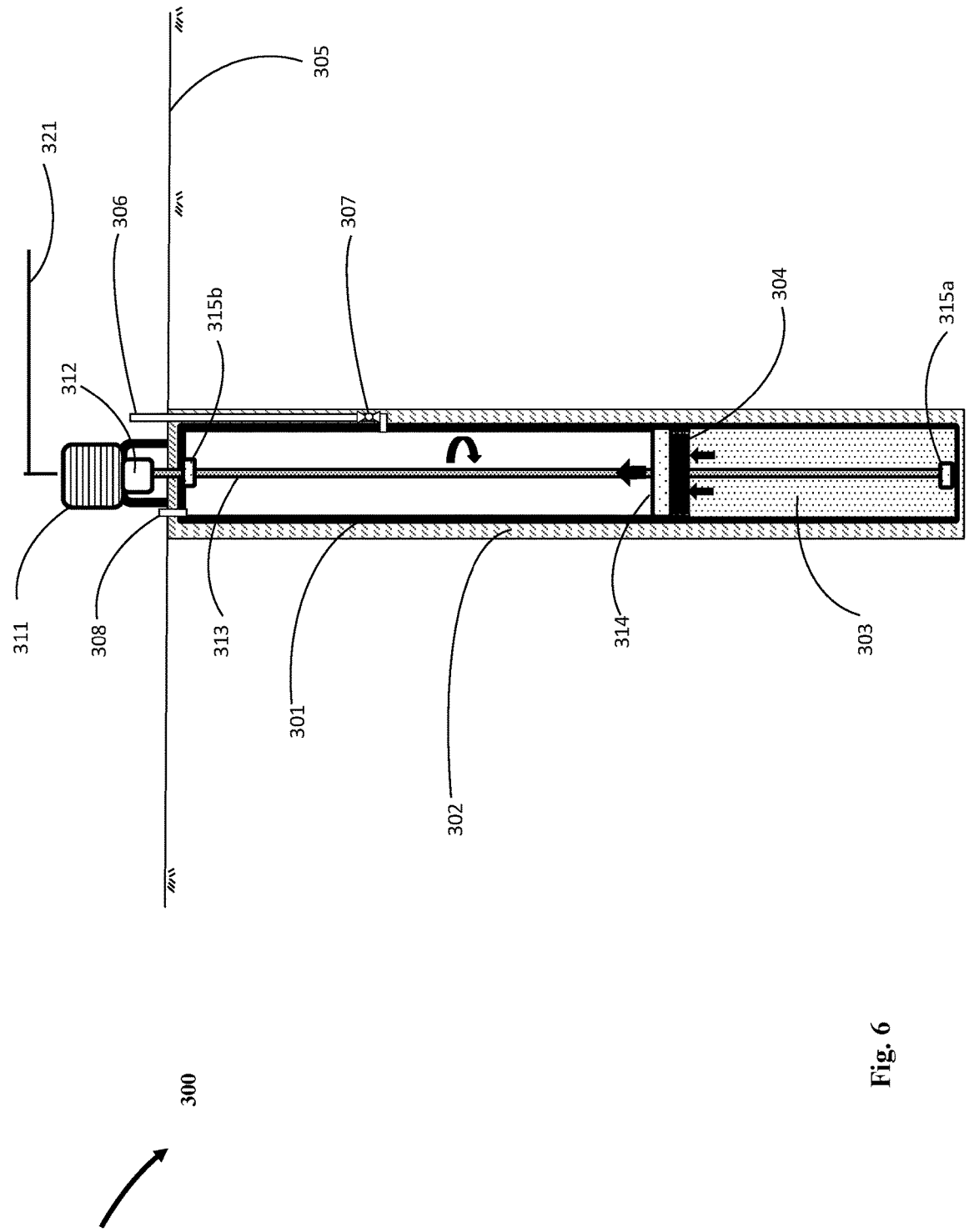
FIG. 6 is a profile of the same embodiment of the present invention as in FIG. 5 during gas expansion.

FIG. 6 shows the embodiment of the present invention 300 of FIG. 5 during expansion with gas 303 having been compressed to maximum pressure and piston 304 being allowed to move out by gas 303. The outward movement of piston 304 pushes screw nut 314 out to rotate screw shaft 313 and provide mechanical power to electrical motor/generator 311 via gear box 312 to function in generator mode to convert mechanical power into electrical power and transmit it out via conductor 321.

Figure 7:
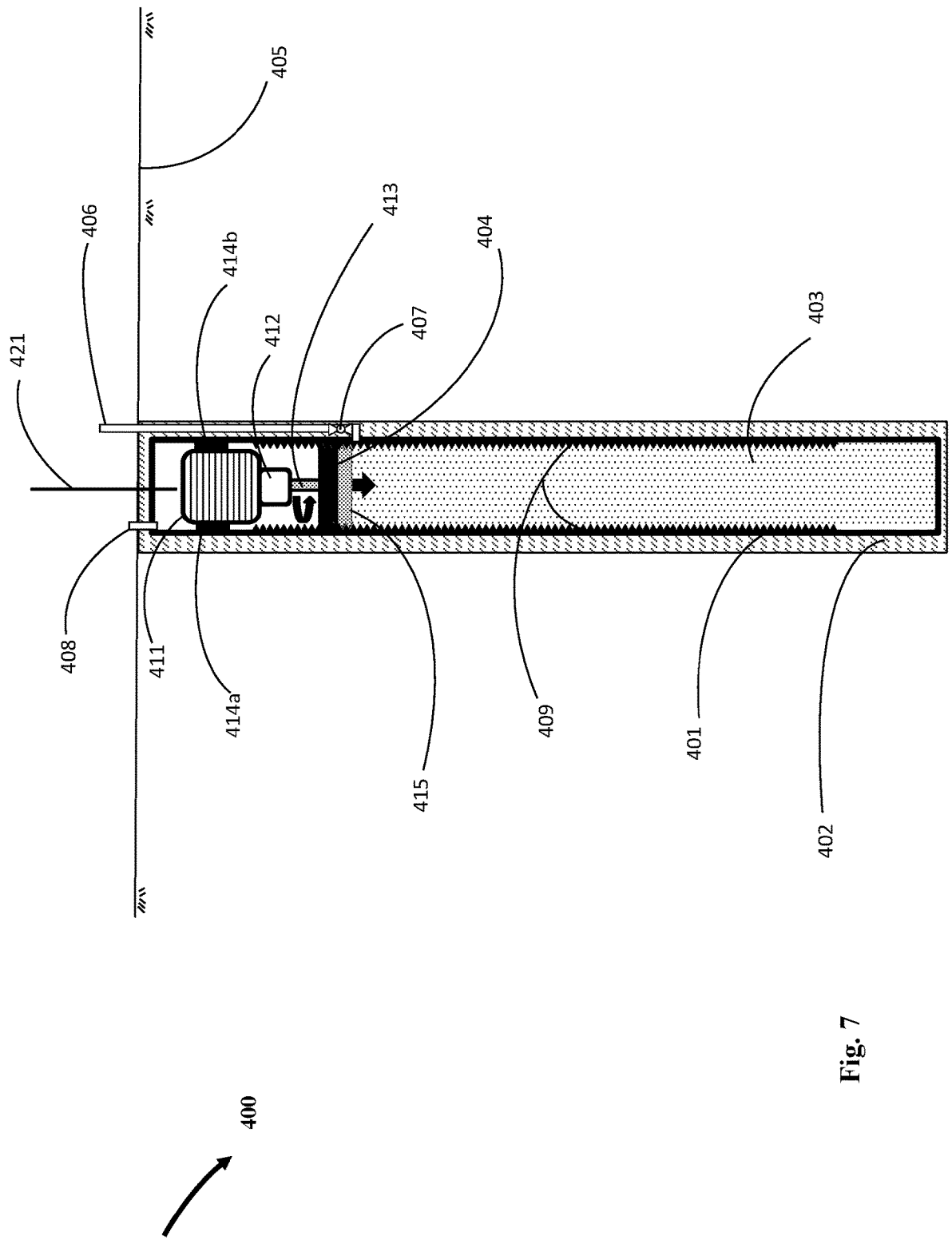
FIG. 7 is a profile of another embodiment of the present invention during gas compression showing a vertical underground cylinder and piston apparatus using a motor/generator inside the cylinder constrained against rotation and in mechanical communication with a threaded pellet that functions as the piston.

Referring to FIG. 7, there is shown another embodiment of the present invention 400 comprised of cylinder 401 installed vertically below ground 405 using conventional vertical shaft drilling techniques, with backfill such as concrete in annulus 402. Cylinder 401 is sealed at lower end and fitted with a moveable mechanical boundary such as piston 404 disposed to separate cylinder 401 into a pneumatic side and a mechanical side. Cylinder 401 is disposed to store gas 403 under pressure as well as function as compression/expansion cylinder by means of piston 404 to compress gas 403 up to certain design pressure and allow expansion back to original pressure, plus function as heat exchanger to transfer heat to and from gas 403 to surrounding ground 405 via surface area of cylinder 401 and annulus 402. The interior surface of cylinder 401 is tapped with screw thread 409 of precise pitch and spacing to fit matching screw thread tapped on the exterior surface of piston 404, which is void of piston rings. There may be objects such as ball bearings (not shown) between screw thread 409 tapped on interior surface of cylinder 401 and matching screw thread tapped on the exterior surface of piston 404 to facilitate rotation. Piston 404 may be fitted with gas-tight dynamic seal 415 on the pneumatic side. Cylinder 401 is initially charged with gas 403 under certain pressure via pressure piping 406 and valve 407. Mechanical side of cylinder assembly is vented to the atmosphere via duct 408.

Electrical motor/generator 411 mounted directly on piston 404 and linked to gear box 412 drives vertical shaft 413 that connects to the center of piston 404 to rotate and thus move piston 404 inward into cylinder 401. Electrical motor/generator 411 is equipped with at least one pair of sliding guides 414a and 414b located opposite one another that fit in corresponding longitudinal grooves (not shown) disposed along the interior length of the cylinder 401 to provide motor/generator assembly 411 with longitudinal freedom of movement while restricting all rotational movement.

During compression in the embodiment of the present invention 400 shown in FIG. 7, electrical conductor 421 supplies electrical energy to electrical motor/generator 411 inside cylinder 401, which functions in motor mode to convert electrical energy to mechanical work and transmit it to vertical shaft 413 via gear box 412 in the sense that rotates piston 404 to move inward and compress gas 403 to store electrical energy as compressed gas energy.

Figure 8:
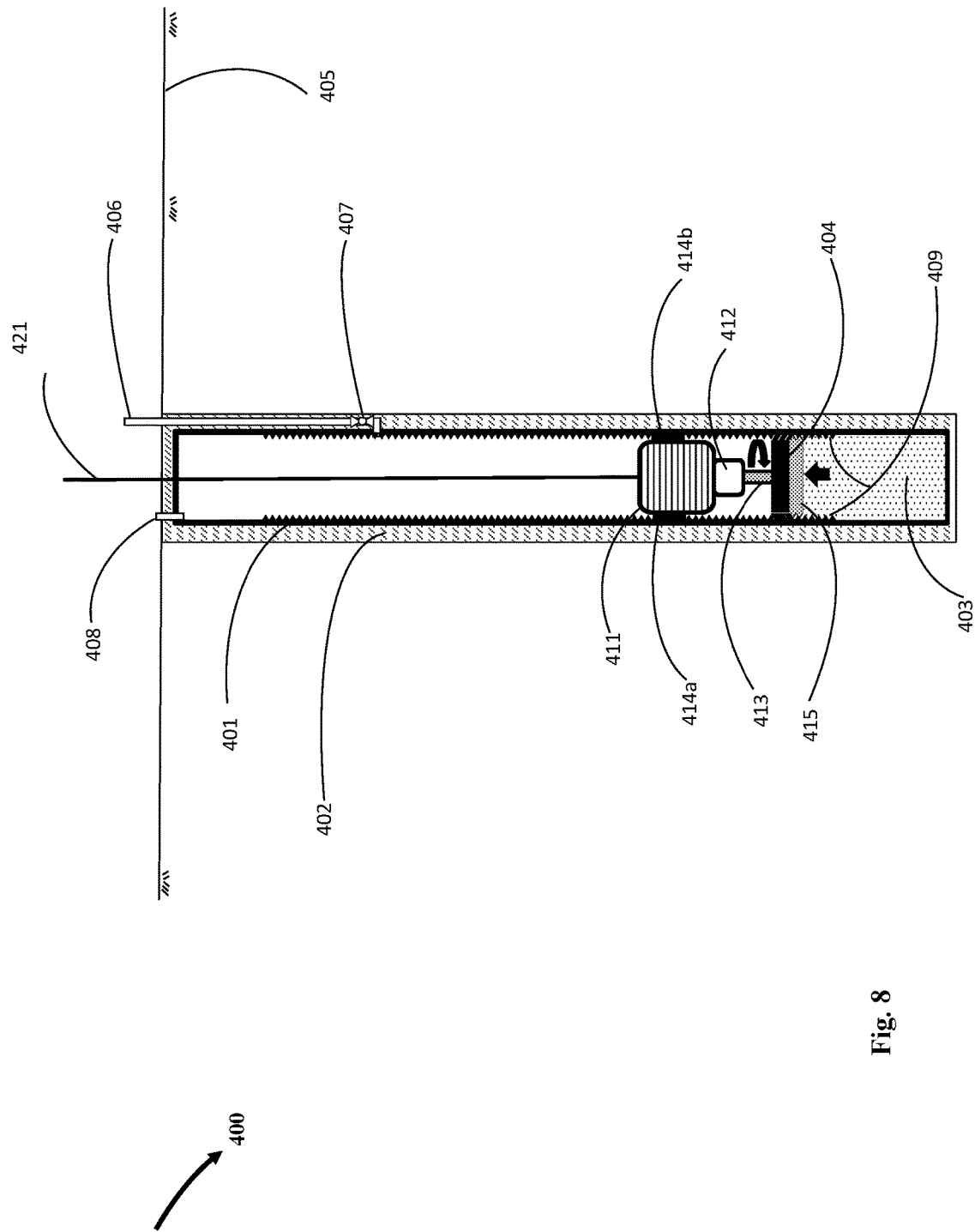
FIG. 8 is a profile of the same embodiment of the present invention as in FIG. 7 at the start of gas expansion.

FIG. 8 shows the embodiment of the present invention 400 of FIG. 7 during expansion with gas 403 having been compressed to maximum pressure and piston 404 being allowed to move out by expanding gas 403. Outward movement of piston 404 causes piston 404 to rotate and thereby rotate shaft 413 and provide mechanical power to electrical motor/generator 411 via gear box 412 and function in generator mode to convert mechanical power into electrical power and transmit it out via conductor 421.

The hypothesis of near-isothermal gas compression and expansion of the present invention may be tested by comparing the work done during either compression or expansion to heat transfer via the cylinder perimeter, with the difference raising the temperature of gas inside, and vice versa. For near-isothermal conditions, the increase/decrease in the temperature of gas for practical rates of compression/expansion must be small enough to be negligible such that the work done during either compression or expansion is practically the same as heat transfer between the gas and the surrounding environment.

The total work done on a gas during compression or by a gas during expansion may be computed using the first law of thermodynamic for isothermal process, while the heat flow via the containing cylinder perimeter, which either goes to increase the temperature of the surrounding environment during compression or increase the temperature of the gas during expansion, can be calculated using the thermal conductivity of the cylinder and the surrounding environment. In mathematical terms, the work involved, W, in isothermal compression/expansion of a gas from an initial pressure and volume, $P_1$ and $V_1$ respectively to final pressure and volume, $P_2$, and $V_2$ is given by the equation $W=P_1V_1 \ln P_1/P_2$, while the initial and final states are related by the equation $P_1V_1=P_2V_2$. These equations can be used to calculate the work involved, W, in isothermal compression/expansion of a gas from any initial pressure and volume, $P_1$ and $V_1$ respectively to a final volume $V_2$ that results in a corresponding pressure, $P_2$. If the rate of compression/expansion is slow enough for the work done, which equals the heat transfer during isothermal compression/expansion via the contact area of the cylinder and exchange with its surrounding environment (soil) through radial thermal conduction, then there is no increase/decrease in the temperature and the process is isothermal.

However, in practice for the heat transfer to occur from/to the cylinder, there must be a radial temperature gradient that drives the heat flow. This means that there has to be some increase/decrease in the temperature of gas inside the cylinder and a radial zone of influence of the surrounding soil affected by the temperature increase/decrease and in heat exchange with the gas. Therefore, in practice, part of the work done in gas compression/expansion results in increasing/decreasing the temperature of gas inside the cylinder, which drives the remainder of the work in term of heat flow to/from the surrounding environment via thermal conduction, which in turn results in an increase/decrease of the temperature of the surrounding environment over a radial zone of influence that linearly changes from maximum/minimum at the interface with the cylinder to zero at the limit of the zone of influence.

Therefore, in mathematical terms $Q=Q_A+Q_S$, where Q is the heat flow out/in during compression/expansion, and subscripts A and S denote Air and Soil respectively, meaning that $Q_A$ is the heat gain/loss by the air inside the cylinder that changes its temperature by a certain amount, $\Delta T$, and $Q_S$ is the heat gain/loss by the surrounding environment (soil) over a certain radial zone of influence that changes its temperature by and average $\Delta T/2$. These may be expressed as $Q_A=M_AC_A\Delta T$ and $Q_S=M_SC_S\Delta T/2$ where M and C denote mass and specific heat capacity respectively, and the mass of soil $M_S=\pi L(r_2^2-r_1^2)\rho_S$ where $r_1$ is the radius of the cylinder, $r_2$ is the radial zone of temperature influence in the soil, L is the length of cylinder containing the compressed gas in heat exchange with the surrounding soil, which may be taken as the average of the cylinder lengths containing the compressed gas at the start and end of compression, and $\rho_S$ is the bulk density of the surrounding soil. The total heat transfer for an isothermal process, Q, equals the work involved, W, which for a near-isothermal process can be approximated with sufficient accuracy using $W=P_1V_1 \ln P_1/P_2$.

Furthermore, the radial heat flow in the soil surrounding the cylinder may be expressed by $Q_S/t=2\pi K_SL\Delta T/\ln(r_2/r_1)$ where t is the time available for heat flow, which is the time taken to compress/expand the gas from initial state to final state i.e. the inverse of the rate of compression/expansion, and $K_S$ is the thermal conductivity of the surrounding soil.

For a specific combination cylinder size, initial and final states, and compression rate, the above noted physical relationships can be used to solve for the zone of temperature influence in the surrounding soil $r_2$ corresponding to a given rate of compression/expansion 1/t, and the change in gas temperature $\Delta T$. If the change in gas temperature $\Delta T$ is small enough to be considered negligible, then the process is near-isothermal and the work involved in compression/expansion of gas, W, is the energy stored in the compressed gas i.e. the energy storage capacity of the present invention for that specific combination.

Using the above-described equations to examine a hypothetical combination of a 16-inch (0.41 m) inside diameter (ID) cylinder of 100 feet (30 m) initial depth below piston, which corresponds to gas volume of 3.89 m³ (137.3 ft³) containing initially compressed air at 10 atmospheres (143 psi, 1.0 MPa) at temperature of 20 degrees Centigrade (° C.), which charges the cylinder with 48 kg (106 lbs) of dry air, and moving the piston down to compress the air to final pressure of 400 atmospheres (5,720 psi, 40 MPa), which correspond to a volume of 0.1 m³ (3.5 ft³) would increase the temperature of gas and surrounding soil by only 0.12° C. if the compression to final pressure occurs over a period of 60 minutes. In this scenario, the calculated zone of radial temperature influence in the surrounding soil, $r_2$, is 2.1 m (7.2 ft) with a corresponding mass of 306,500 kg (674,300 lbs) in heat exchange with the cylinder, and the total heat gain by gas inside the cylinder and the surrounding soil are 4 and 14,350 kilo Joules (kJ) respectively i.e. only about 0.03% of the total work done (heat generated) is retained in the cylinder to increase the temperature of gas inside, which is very small, and the great majority of the work (99.97%) is conducted into the surrounding soil. The temperature increase during compression of 0.12° C. is very small and practically negligible such that the process can be assumed to be isothermal for practical purposes. The total work done is 14,350+4=14,354 kJ (4.0 kWh), which takes place over a period of 60 minutes i.e. at a rate of 4.0 kW. This means that the cylinder of this example can store 4.0 kWh of electrical energy with an electrical power input of 4.0 kW over 60 minutes, and would recover the energy by allowing gas to expand at the same rate. The cylinder could store the same amount of electrical energy at half the rate and twice the duration, which would result in an even less temperature change. In this and other examples described herein, the values used for the soil and air parameters were soil thermal conductivity 0.80 (Watts/m/° C.), specific heat capacity of dry Soil 0.80 (kJ/kg/° C.), specific heat capacity of air 1.01 (kJ/kg/° C.), and soil bulk unit weight 93.6 (lbs/ft$^3$).

Performing the same calculations as above for the exact same cylinder and compression rate, except using an initial gas pressure of 150 atmospheres (2,145 psi, 15 MPa) at temperature of 20° C., would charge the cylinder with 715 kg (1,573 lbs) of dry air. Moving the piston down to compress the air to a final pressure of 400 atmospheres (5,720 psi, 40 MPa), which corresponds to a volume of 1.5 m$^3$ (52.9 ft$^3$), would increase the temperature of gas by 0.36° C. if the compression to final pressure occurs over a period of 60 minutes. In this scenario, the calculated zone of radial temperature influence in surrounding soil, $r_2$, is also 2.1 m (7.2 ft) since this is only affected by the compression rate. However, the corresponding mass of affected soil is larger at 411,200 kg (904, 640 lbs), which is 34% more than in the previous example, because the length of the cylinder below piston that is in heat exchange with the surrounding soil at the final state is more. In this example, the total heat gained by gas inside the cylinder and the surrounding soil are 198 and 57,004 kJ respectively i.e. still only a very small fraction (0.35%) of the total work done (heat generated) is retained in the cylinder to increase the temperature of gas inside and the great majority of the heat generated during compression is conducted into the surrounding soil. The resulting temperature increase during compression of 0.36° C. is still very small and practically negligible and the process can be assumed to be isothermal for practical purposes. The total work done is 57,004+198=55,202 kJ (15.9 kWh), which takes place over a period of 60 minutes i.e. at a rate of 15.9 kW. This means that the cylinder of this example can store 15.9 kWh of electrical energy with an electrical power input of 15.9 kW over 60 minutes, and would recover the energy by allowing gas to expand at the same rate.

The slight increase in the final temperature and significant increase in energy storage capacity demonstrated by the above two examples are indicative of the energy storage characteristics of the present invention. In order to further reveal the energy storage characteristics of the present invention, a series of calculations were carried out for a range of cylinder sizes, initial gas pressures, and compression rates and the results were plotted graphically. All calculations assumed an initial temperature of 20° C. and final pressure of 40 MPa.

Figure 9:
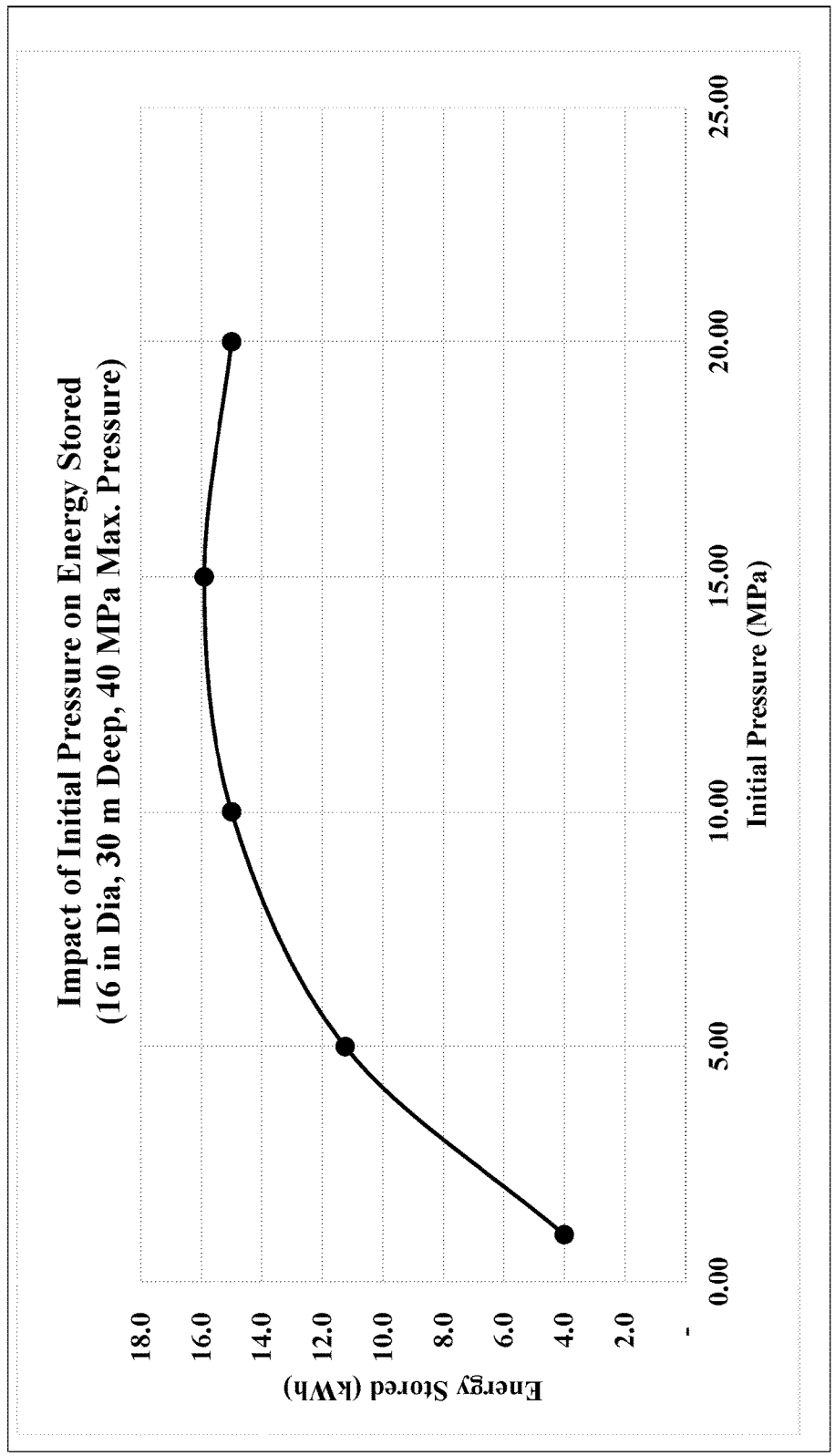
FIG. 9 is a graph of calculation results showing the impact of initial gas pressure on energy stored.

Referring to FIG. 9 there is shown calculation results for initial pressure values ranging from 1.0 to 20 MPa (on the horizontal axis) in a hypothetical 16-inch (0.41 m) inside diameter (ID) cylinder of 100 feet (30 m) initial depth below piston, which corresponds to a gas volume of 3.89 m$^3$ (137.3 ft$^3$). The calculations assumed an initial temperature of 20° C. and moved the piston down to compress the air to a final pressure of 40 MPa, which correspond to final volumes ranging from 0.1 to 1.9 m$^3$, over a duration of 60 minutes that resulted in negligible temperature rise in the compressed gas. The corresponding calculated values on the vertical axis show that the energy stored increases by increasing the initial gas pressure up to an initial gas pressure value of 15.0 MPa, resulting in a maximum energy storage value of 15.9 kWh. This may be considered as the "optimum" initial pressure value for this particular size cylinder and final pressure. Increasing the initial pressure beyond this value for this case would decrease the energy stored. The computed temperature rise for the data points shown in FIG. 9 ranged from 0.12 to 0.36° C. all corresponding to a compression duration of 60 minutes.

Figure 10:
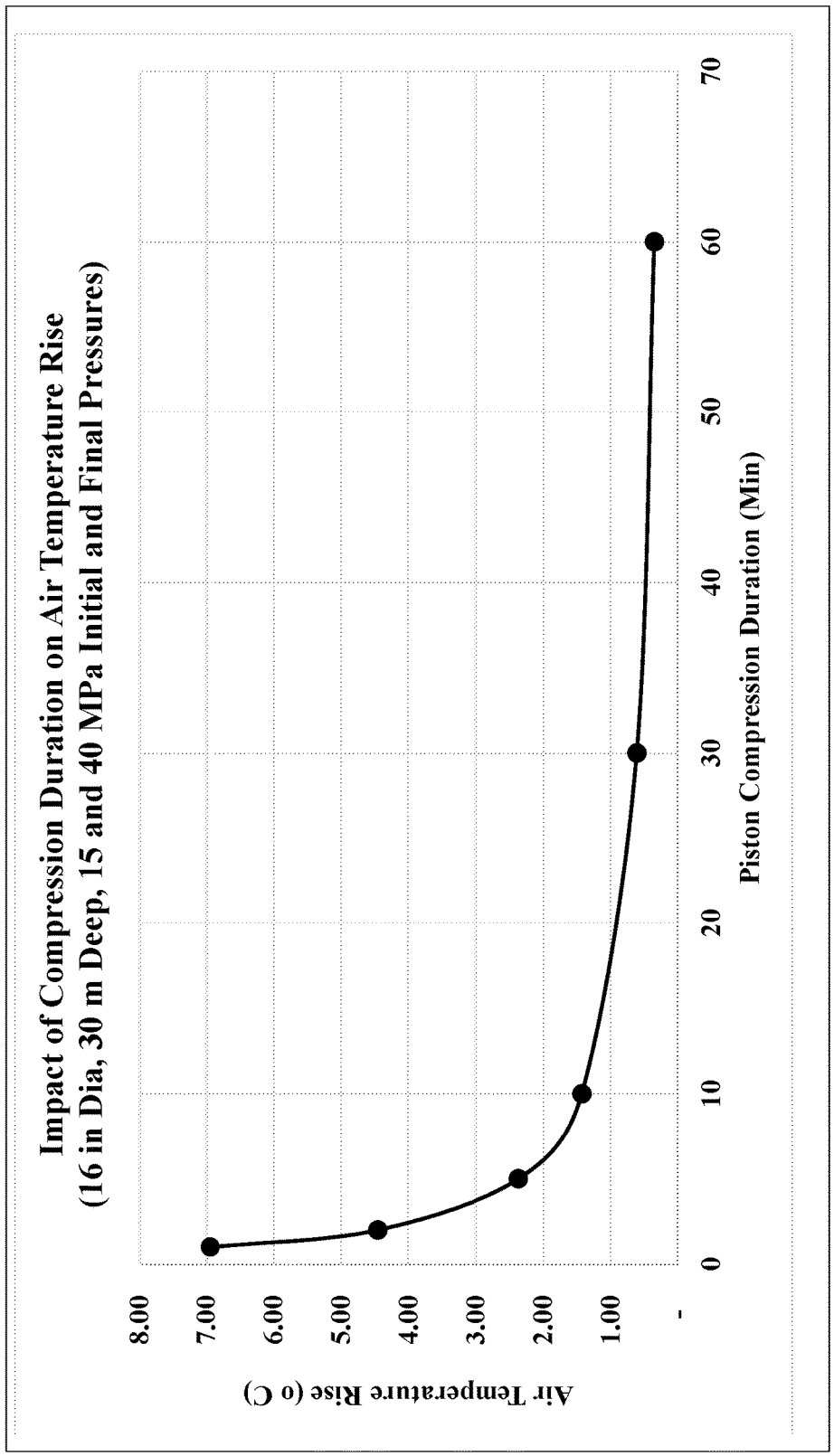
FIG. 10 is a graph of calculation results showing the impact of compression duration on air temperature rise.

Referring to FIG. 10 there is shown the calculation results for a range of compression durations (on horizontal axis) ranging from 1 to 60 minutes, for a hypothetical 16-inch (0.41 m) inside diameter (ID) cylinder of 100 feet (30 m) initial depth below piston, which corresponds to a gas volume of 3.89 m$^3$ (137.3 ft$^3$) for initial pressure value of 15.0 MPa. The calculations assumed an initial temperature of 20° C. and moved the piston down to compress the air to a final pressure of 40 MPa, which correspond to a final gas volume of 1.5 m$^3$. The corresponding calculated values on the vertical axis show that the temperature rise of the compressed gas inside the cylinder range from 7.0° C. corresponding to compression duration of 1 minute to 0.35° C. for compression duration of 60 minutes. The results demonstrate that for compression rates encountered in practice, which are more than 60 minutes and in the order of several hours, the hypothesis of near-isothermal conditions for the present invention are valid. According to the result shown in FIG. 10 condition do not really begin to deviate from near-isothermal until one approaches compression durations of less than 10 minutes, which would not be encountered in practical applications of the present invention. Therefore, FIG. 10 validates the near-isothermal hypothesis of the present invention.

Figure 11:
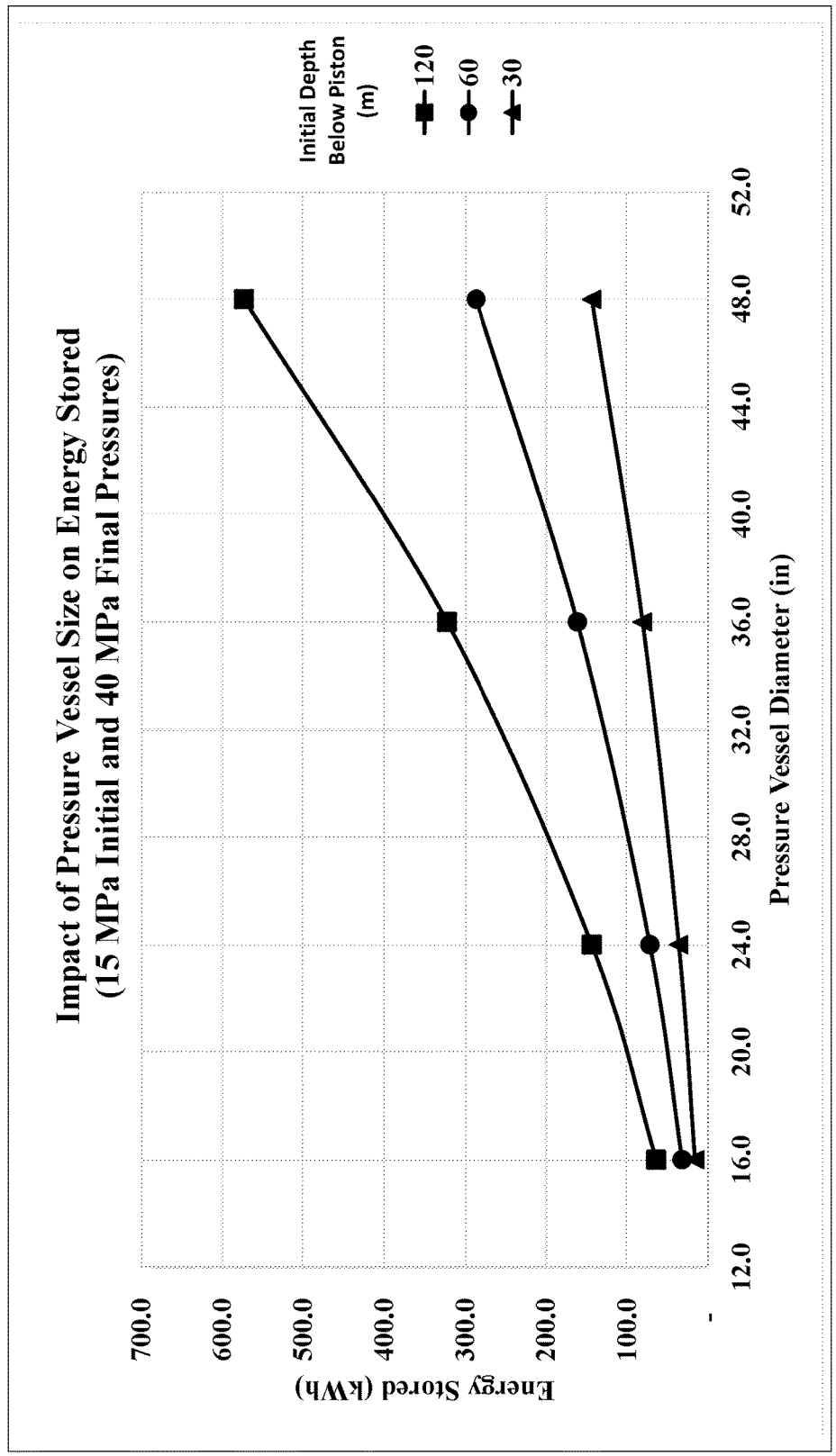
FIG. 11 is a graph of calculation results showing the impact of cylinder size on energy stored.

Referring to FIG. 11 there is shown the calculation results for several hypothetical cylinders with internal diameters ranging from 16 to 48 inches (on the horizontal axis) and three initial cylinder lengths below piston of 30, 60, and 120 meters, shown as individual series. The calculations assumed an initial temperature of 20° C. and moved the piston down to compress the air from an initial pressure of 15 MPa to final pressure of 40 MPa, with a compression duration of 120 minutes, which maintains near-isothermal conditions in all cases. The corresponding calculated values on the vertical axis show that the theoretical energy storage capability of the present invention corresponding to the range of cylinder sizes and pressures examined ranges from 4 to 570 kWh per unit. The energy storage capability of each unit may be increased by increasing the length of the cylinder, which is possible using conventional drilling technologies. The fact that the present invention is modular and can be installed in multiple units, each with a small footprint, provides virtually unlimited energy storage capability in most practical situations.

The present invention is susceptible to modifications and variations which may be introduced thereto without departing from the inventive concepts and the object of the invention. Mechanisms other than those described may be used to transmit power across the movable mechanical barrier to store/recover compressed air energy. Also, the cylinder of the present invention, which also functions as the heat exchanger and the compression/expansion cylinder, may be installed in environments other than belowground and orientations other than vertical. Such modifications and variations do not depart from the inventive concepts and the object of the present invention, which is to provide a method and apparatus for near-isothermal closed-air CAES using a cylinder that simultaneously functions as the storage tank, heat exchanger, and the compression/expansion cylinder.

While the present invention has been described in connection with what is considered the most practical and preferred embodiments, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A method and apparatus for near-isothermal compression and expansion of a gas, the method and apparatus comprising:
   a cylinder disposed to store gas under pressure, serve as gas compression and expansion chamber, and exchange heat with surrounding environment,
   a movable mechanical boundary mechanism inside said cylinder to separate said cylinder into a pneumatic side and a mechanical side, and transfer energy there between, the mechanism comprising:
      a piston,
      at least one pair of opposite facing gears mounted on said piston and disposed to engage with internal surface of said cylinder,
      at least two longitudinal rows of equally-spaced slots accommodated within interior surface of said cylinder disposed to engage with said gears,
      at least one electrical motor that also functions as electrical generator (motor/generator) mounted on said piston disposed to convert electrical power to mechanical power and vice versa,
      at least one mechanical power train disposed to transmit power there between said motor/generator and said piston via said gears,
      an electrical conductor disposed to transmit electrical power to and from said electrical motor/generator,
   a tube connected to said pneumatic side of said cylinder enabling initial charging of said pneumatic side with pressurized gas,
   a valve on said tube enabling isolation of said pneumatic side,
   an air vent connected to said mechanical side of said cylinder enabling exchange of air with atmosphere.

2. The system of claim 1, wherein said electrical motor/generator is mounted at a fixed location outside said cylinder and replaced with a hydraulic motor that can also function as a pump (motor/pump) that is in fluid communication with a second hydraulic motor/pump that is in mechanical communication with said motor/generator.

3. A method and apparatus for near-isothermal expansion and compression of a gas, the method and apparatus comprising:
   a cylinder disposed to store gas under pressure, serve as gas compression and expansion chamber, and exchange heat with surrounding environment,
   a movable mechanical boundary mechanism disposed inside said cylinder to separate said cylinder into a pneumatic side and a mechanical side, and transfer energy there between, the mechanism comprising:
      a piston,
      a screw shaft disposed longitudinally at center of said cylinder that traverses said piston at center,
      at least two bearings to support said screw shaft in position while providing said screw shaft with rotation capability about longitudinal axis,
      at least one screw nut having matching thread with said screw shaft mounted on said piston and fitted with sliding mechanism to engage said screw nut with said cylinder to allow longitudinal movement of said screw nut while preventing angular movement,
      at least one fixed electrical motor that also functions as electrical generator (motor/generator) in mechanical communication with said screw shaft, disposed to convert electrical power to mechanical power and vice versa,
      an electrical conductor disposed to transmit electrical power to and from the said electrical motor/generator,
   a tube connected to said pneumatic side of said cylinder enabling initial charging of said pneumatic side with pressurized gas,
   a valve on said conduit enabling isolation of said pneumatic side,
   an air vent connected to said mechanical side of said cylinder enabling exchange of air with atmosphere.

4. A method and apparatus for near-isothermal expansion and compression of a gas, the method and apparatus comprising:
   a cylinder disposed to store gas under pressure, serve as gas compression and expansion chamber, and exchange heat with surrounding environment,
   a movable mechanical boundary mechanism disposed inside said cylinder to separate said cylinder into a pneumatic side and a mechanical side, and transfer energy there between, the mechanism comprising:
      a circular pellet having precisely matching thread on outer surface with interior surface thread of said cylinder to function as a piston,
      at least one electrical motor that also functions as electrical generator (motor/generator) inside said cylinder in mechanical communication with said piston fitted with sliding mechanism to engage said motor/generator with said cylinder to allow longitudinal movement of said motor/generator while preventing angular movement,
      an electrical conductor disposed to transmit electrical power to and from said electrical motor/generator,
   a tube connected to said pneumatic side of said cylinder enabling initial charging of said pneumatic side with pressurized gas,
   a valve on the said tube enabling isolation of said pneumatic side,
   an air vent connected to the said mechanical side of the said cylinder enabling exchange of air with atmosphere.

5. The method and apparatus of claim 4, wherein said pellet is equipped with a seal to prevent gaseous exchange between the said pneumatic side and the said mechanical side.

* * * * *